United States Patent
Jha et al.

(10) Patent No.: US 9,783,319 B2
(45) Date of Patent: Oct. 10, 2017

(54) EXTERIOR AIRCRAFT LIGHT UNIT AND AIRCRAFT COMPRISING THE SAME

(71) Applicant: Goodrich Lighting Systems GMBH, Lippstadt (DE)

(72) Inventors: Anil Kumar Jha, Lippstadt (DE); Andre Hessling Von Heimendahl, Koblenz (DE); Franz-Josef Beermann, Warstein-Belecke (DE); Christian Schoen, Mainz (DE); Sascha Lueder, Rietberg (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 14/825,907

(22) Filed: Aug. 13, 2015

(65) Prior Publication Data
US 2016/0046389 A1 Feb. 18, 2016

(30) Foreign Application Priority Data
Aug. 14, 2014 (EP) ..................................... 14180962

(51) Int. Cl.
| | | |
|---|---|---|
| B64D 47/06 | (2006.01) | |
| F21V 5/04 | (2006.01) | |
| F21W 101/06 | (2006.01) | |
| F21Y 101/00 | (2016.01) | |
| F21Y 115/10 | (2016.01) | |

(52) U.S. Cl.
CPC ............. *B64D 47/06* (2013.01); *F21V 5/048* (2013.01); *B64D 2203/00* (2013.01); *F21W 2101/06* (2013.01); *F21Y 2101/00* (2013.01); *F21Y 2115/10* (2016.08)

(58) Field of Classification Search
CPC ...... B64D 47/06; B64D 2203/00; F21V 5/048
See application file for complete search history.

(56) References Cited

U.S. PATENT DOCUMENTS

| | | |
|---|---|---|
| 6,191,541 B1 | 2/2001 | Patel et al. |
| 2005/0047167 A1 | 3/2005 | Pederson et al. |
| 2010/0027281 A1 | 2/2010 | Waters et al. |

FOREIGN PATENT DOCUMENTS

| | | |
|---|---|---|
| EP | 1731423 A1 | 12/2006 |
| EP | 2023038 A2 | 2/2009 |
| WO | 2009084049 A1 | 7/2009 |
| WO | 2013181402 A2 | 12/2013 |

OTHER PUBLICATIONS

Cirrus Aircraft: "The All-New 2014 Generation 5 Cirrus Aircraft", Internet Citation, Oct. 10, 2013, pp. 1-4, XP002718830, Retrieved from the Internet: URL:http://cirrusaircraft.com/news/the-all-new-2014-generation-5-cirrus-aircraft/ [retrieved on Jan. 14, 2014].
Notification of Transmittal of the European Search Report; EP Application No. 14180962.4-1754; Feb. 9, 2015, 10 pages.

*Primary Examiner* — Thomas M Sember
(74) *Attorney, Agent, or Firm* — Cantor Colburn LLP (57) ABSTRACT

An exterior aircraft light unit includes a mounting structure, a plurality of first light sources arranged on the mounting structure, and a lens cover arranged over the plurality of first light sources, the lens cover having a convex shape at least in a first cross-sectional plane, wherein the plurality of first light sources are arranged in a curved pattern, with the curved pattern having the same direction of curvature as the convex shape of the lens cover in the first cross-sectional plane.

18 Claims, 4 Drawing Sheets

EXTERIOR AIRCRAFT LIGHT UNIT AND AIRCRAFT COMPRISING THE SAME

TECHNICAL FIELD

The present invention relates to exterior aircraft lighting. In particular, it relates to exterior aircraft light units that are arranged in space-critical parts of an aircraft, such as wing tip locations.

BACKGROUND

Almost all aircraft are equipped with exterior light units. Exterior lights are used for a variety of purposes. Some aircraft lights allow the pilots and crew to have a better active visibility of the aircraft itself and of the environment. Other lights are used for passive visibility of the aircraft or for signalling purposes. Examples of such lights are navigation lights, beacon lights or anti-collision lights.

In modern aircraft technology, there is a strong trend towards efficiency. This trend results in material savings for weight reasons and head surface reduction for aerodynamic purposes, wherever possible. The resulting desire to save space also affects the exterior lighting of the aircraft. With the light units becoming smaller and more space-restricted, it is getting harder to satisfy light emission requirements, as for example set by the Federal Aviation Regulations (FAR).

Accordingly, it would be beneficial to provide an exterior aircraft light unit that is able to satisfy predefined or desired light emission requirements without posing too much of a burden in terms of required space.

SUMMARY

An exemplary embodiment of the invention includes an exterior aircraft light unit, comprising a mounting structure, a plurality of first light sources arranged on the mounting structure, and a lens cover arranged over the plurality of first light sources, the lens cover having a convex shape at least in a first cross-sectional plane. The plurality of first light sources are arranged in a curved pattern, with the curved pattern having the same direction of curvature as the convex shape of the lens cover in the first cross-sectional plane.

The combination of the curved pattern of the first light sources and the convex shape of the lens cover allows for a very space-efficient design of the exterior aircraft light unit and allows for very favourable conditions in terms of using the light emitted by the first light sources for satisfying desired/required light intensity distributions. The convex shape of the lens cover and the curved pattern of the first light sources allow for the overall dimensions of the exterior aircraft light unit to be small, as compared to prior art approaches. In addition, the convex shape of the lens cover allows for the exterior aircraft light unit to be integrated into aerodynamic structures of the aircraft that have a relatively small curvature radius, such as the wing tips of an airplane. The convex shape of the lens cover may be readily integrated into and contribute to the aerodynamic structure in question.

With the first light sources being arranged in the curved pattern, a lot of the light emitted by the first light sources reaches the lens cover at an angle that is much closer to a normal angle than in prior art approaches, where a convex shape lens cover was combined with a straight line arrangement of light sources. Such reaching of the lens cover at an angle close to normal has various advantages. First, the influence of the lens cover on the light intensity distribution emitted from the exterior aircraft light unit is kept low. The greater the deviation from said normal angle is, the greater is the refractive effect by the lens cover. Keeping this effect low allows a shaping of the desired light intensity distribution by one or more refractive optical elements within the exterior aircraft light unit, as discussed below, without having to account for a strong influence by the lens cover. Second, the amount of internal reflection at the lens cover can be kept small. Such internal reflection not only adversely effects the overall light yield of the exterior aircraft light unit. It may also lead to entirely undesired effects, such as a further reflection at some structure within the exterior aircraft light unit and an ensuing leaving of the lens cover in an entirely undesired direction, such as towards the cockpit windows.

Accordingly, the combination of the curved pattern of the first light sources and the convex shape of the lens cover may lead to a significantly reduced size of the aircraft light unit, to a better integration into aerodynamic structures, and to an increased efficiency. The reduced size may also lead to a lower weight of the exterior aircraft light unit. The higher efficiency may also lead to lower electrical power consumption, which in turn leads to lower heat generation, better thermal management and higher reliability. By being smaller and being easily integrated into the curvature of an aerodynamic structure, such as an airplane wing surface, the exterior aircraft light unit may only need a small opening to be inserted. This eliminates the need for big cut-outs in the wing structure, as were common for the big and expensive cover lenses of the prior art.

The term convex shape refers to the direction of curvature, when seen from outside of the exterior aircraft light unit. Accordingly, the lens cover has a convex shape when seen from the outside in an installed condition. Conversely, when seen from the plurality of first light sources, the lens cover has a concave shape.

The expression same direction of curvature refers to the same characterization in terms of being convex or concave. Accordingly, when the exterior aircraft light unit is installed and when the lens cover is removed, the curved pattern of the first light sources is a convexly curved pattern when viewed at from the outside.

The expression arranged in a curved pattern refers to an arrangement where the mounting bases of the light sources are angled with respect to each other in such a way that the normal light emission directions of the first light sources are angled with respect to each other. In other words, the expression curved pattern refers to an angled arrangement of the normal light emission directions of the first light sources. In yet other words, the plurality of first light sources are oriented towards the convex shape lens cover in the first cross-sectional plane.

The term lens cover refers to the outermost portion of the exterior aircraft light unit, through which the light is emitted. The lens cover is a generally transparent structure that allows for the light from the first light sources to travel therethrough. The lens cover may be fully transparent and permit all colours of light therethrough. It is also possible that the lens cover is a colour filter and ensures the output of certain wavelengths only.

In accordance with a further embodiment, the plurality of first light sources are arranged as a row of adjacent light sources in the curved pattern. In other words, the first light sources form a single file of light sources along the curved pattern. In this way, the first light sources may be placed in similar positions with respect to the convex shape lens cover. This allows for a particularly manageable shaping of the joint light emission distribution of the plurality of first light sources. The first light sources all benefit from the arrangement in the curved pattern in a similar.

According to a further embodiment, a curvature radius of the lens cover is between 100% and 200%, in particular between 100% and 140%, of a curvature radius of the curved pattern along at least 80% of the curved pattern in the first cross-sectional plane. In this way, a strong correspondence between the shapes of the lens cover and the curved pattern of the first light sources is achieved. The more similar the curvature radius of the curved pattern and the curvature radius of the lens cover are, when the lens cover and the curved pattern are positioned close to each other, the higher the portion of the light that reaches the lens cover at an angle close to normal. The light emitted from the plurality of first light sources towards the lens cover at an angle that is not normal to the lens cover will be affected less by the refractive action of the lens cover, the more the curvature radius of the lens cover and the curvature radius of the curved pattern correspond. It is possible that the curved pattern and/or the convex shape are circular. However, this is not necessarily the case. In fact, the convex shape and/or the curved pattern may be at least partially non-circular in many applications. Accordingly, the curvature radius may change along the convex shape and/or along the curved pattern in the first cross-sectional plane. In other words, for every point along the curved pattern and along the convex shape, a specific curvature radius can be determined. The comparison between the curvature radius of the curved pattern and the curvature radius of the convex shape takes place in such a way that the curvature radius at a specific point of the curved pattern is compared to the curvature radius of a point of the convex shape that is reached by a straight line leaving the curved pattern in a direction normal thereto.

It is also possible that the ratio of the curvature radius of the curved pattern and the curvature radius of the convex shape are defined the other way around. According to a further embodiment, a curvature radius of the curved pattern may be between 50% and 100%, in particular between 70% and 100%, of a curvature radius of the lens cover in the first cross-sectional plane along at least 80% of the curved pattern. While these threshold values do not entirely correspond to the threshold values given above, analogous benefits may be achieved.

According to a further embodiment, the curved pattern and the lens cover have such corresponding shapes that light emitted from the plurality of first light sources in a direction normal to the curved pattern reaches the lens cover at an angle of less than 45°, in particular of less than 30°, with respect to a direction normal to the lens cover. In this way, even in cases where the curvature radius of the curved pattern and the curvature radius of the lens cover greatly deviate from each other, it can be ensured that at least the light emitted from the plurality of first light sources in a normal direction, which generally is the strongest light emission direction, reaches the lens cover at a favourable angle. Of course, these corresponding shapes leading to favourable angles, are particularly beneficial in the case of the curvature radius of the curved pattern and the curvature radius of the lens cover corresponding to a great extent, as discussed above.

According to a further embodiment, the lens cover has a convex shape in a plurality of second cross-sectional planes orthogonal to the first cross-sectional plane and extending through the plurality of first light sources. In other words, each of the second cross-sectional planes may be defined with respect to one of the plurality of first light sources. In particular, the second cross-sectional plane in question may be orthogonal to the first cross-sectional plane, extend through the center of the respective first light source, and contain the light emission direction normal to the curved pattern. By having such a convex shape in a plurality of second cross-sectional planes, the lens cover may fit into the aerodynamic structure of the aircraft in multiple dimensions. For example, the convex shape in the first cross-sectional plane may track the front edge curvature of an airplane wing, while the convex shape in the plurality of second cross-sectional planes may track the airfoil profile on the upper and/or lower surface of the wing of the airplane.

According to a further embodiment, the plurality of first light sources are spaced from the lens cover in such a way that the light, emitted from the plurality of first light sources in the plurality of second cross-sectional planes at an angle of less than 45° with respect to a direction normal to the curved pattern, reaches the lens cover at an angle of less than 30°, in particular of less than 20°, with respect to a direction normal to the lens cover. In other words, the convex curvature of the lens cover in the plurality of second cross-sectional planes is such that the lens cover wraps around the plurality of first light sources in the respective second cross-sectional planes. In this way, any undesired refractive effects of the lens cover in the plurality of second cross-sectional planes are reduced. Again, it is ensured that much of the light emitted by the plurality of first light sources reaches the lens cover at angles close to a normal angle. Again, this reduces undesired refractive effects and undesired internal reflection.

According to a further embodiment, for each of the plurality of first light sources, a distance between the respective first light source and the lens cover is less than 200%, in particular between 50% and 150%, of a curvature radius of the lens cover in the respective second cross-sectional plane. With this implementation, much of the light from the plurality of first light sources, as emitted in the second cross-sectional planes, may reach the lens cover in an almost normal way. For the particular case of the lens cover having a circular convex shape in the second cross-sectional plane in question and the first light source in question being arranged at a distance of 100% of the curvature radius, all light of the first light source in the second cross-sectional plane in question will reach the lens cover at a normal angle. Due to other constraints with respect to the shape of the lens cover (such as for aerodynamic reasons) and due to additional optical elements placed within the exterior aircraft light unit, such an ideal scenario does not take place in most conditions. However, placing the plurality of first light sources in the discussed distance range with respect to the lens cover allows for a reduction of undesirable refraction effects by the lens cover. Again, the curvature radius of the lens cover in the respective second cross-sectional plane may change along the lens cover. For the purpose of the above feature, the curvature radius of the lens cover in the respective second cross-sectional plane is defined to be the curvature radius of the lens cover in the respective second cross-sectional plane in the normal emission direction of the respective first light source.

According to a further embodiment, a refractive optical element is arranged between the plurality of first light sources and the lens cover. In this way, a desired light emission distribution may be shaped on the inside of the lens cover, before the light from the plurality of first light sources reaches the lens cover. In particular, it is possible that exactly one refractive optical element is provided for shaping the light emission distribution of the plurality of first light sources jointly. It is also possible that multiple refractive optical elements are arranged between the plurality of first light sources and the lens cover, with each of the multiple refractive optical elements shaping the light emission distribution of one or more first light sources. Said refractive optical element(s) and the lens cover transform the light intensity distribution, as emitted by the plurality of the first light sources, into the output light emission distribution of the exterior aircraft light unit. It is possible to design the refractive optical element(s) in such a way that it/they provide(s) for the desired transformation by itself/themselves and to design the lens cover for minimum optical effects. It is also possible to split up the transformation between the refractive optical element(s) and the lens cover.

According to a further embodiment, the refractive optical element has a curved shape, extending along the curved pattern of the plurality of first light sources. In this way, the curved refractive optical element may effect the light emitted by the plurality of first light sources in an identical or similar manner for all of the first light sources.

According to a further embodiment, the refractive optical element comprises, in at least one second cross-sectional plane orthogonal to the first cross-sectional plane and extending through one of the plurality of first light sources, a combination of convex and concave outer surface portions. Such a combination of convex and concave outer surface portions allows for a particularly efficient way of transforming the light emission distribution into a desired light emission distribution in the second cross-sectional plane, in particular into a desired vertical light intensity distribution of an anti-collision light. In a particular embodiment, the combination of convex and concave outer surface portions may be symmetrical with respect to the main light emission direction of the first light source, i.e. with respect to the emission direction normal to the mounting structure.

According to a further embodiment, a space between the plurality of first light sources and the lens cover is free of reflectors. The space may also be free of shutters. In particular, the exterior aircraft light unit as a whole may be configured to have no reflectors and/or no shutters. In this way, an optimized portion of the light emitted by the first light sources may be used for the desired/required output light intensity distribution.

According to a further embodiment, the exterior aircraft light unit is configured to be mounted to an aircraft with the first cross-sectional plane being oriented horizontally. In this way, the spread of the light emission distribution due to the curved pattern of the plurality of first light sources can be taken advantage of in a horizontal plane. This is particularly beneficial for light units with a comparably large opening angle in a horizontal direction, such as anti-collision lights.

According to a further embodiment, the exterior aircraft light unit is one of an anti-collision light unit and a beacon light unit. Both anti-collision lights and beacon lights are provided on most airplanes for avoiding collisions. Anti-collision lights are commonly flashing lights that may be installed in the wing tips and the tail of the an airplane in order to call a high degree of attention to the airplane. Anti-collision lights are mainly used during the flight. Beacon lights are often installed on the top and at the belly of the airplane fuselage. They often emit light in a revolving pattern, in particular attracting attention to the airplane on the ground when the engines are running. They are particularly helpful for ground personnel as a warning sign.

According to a particular embodiment, the exterior aircraft light unit may emit light of a white and/or red colour.

According to a further embodiment, the exterior aircraft light unit is configured to be arranged in an aerodynamic structure of an airplane wing, in particular of an airplane wing tip.

According to a further embodiment, the exterior aircraft light unit further comprises at least one second light source arranged on the mounting structure and positioned besides the curved pattern of the plurality of first light sources. In this way, the exterior aircraft light unit may be adapted to integrate the functions of two exterior aircraft light units into one housing and underneath one lens cover. This again saves space and allows for a space- and power-efficient design of the overall aircraft lighting.

According to a further embodiment, each of the at least one second light source has a dedicated refractive optical element arranged between the respective second light source and the lens cover. These dedicated refractive optical elements allow for a desired transformation of the light emission distribution of the at least one second light source. The shaping of the light emission from the at least one second light source can be performed independently from the shaping of the light emission from the plurality of first light sources, leading to an overall highly accurate and space-efficient design.

In a particular embodiment, the plurality of first light sources, the refractive optical element, the at least one second light source, and the dedicated refractive optical element(s) may be arranged in such a way that no crossing between the light of the first light sources and the light of the at least one second light source takes place, before the light is refracted by the refractive optical element and the dedicated refractive optical element(s).

According to a further embodiment, the plurality of first light sources and the at least one second light source may be connected to one circuit board. In other words, all of the plurality of first light sources and the at least one second light source may be connected to the same circuit board. Accordingly, only one circuit board may be needed for providing the functionality of two different light units. The circuit board may be a printed circuit board or any other kind of circuit board, to which the light sources may be attached for their electrical connections.

According to a further embodiment, the exterior aircraft light unit is one of a combined anti-collision and navigation light unit and a combined beacon and navigation light unit, with the plurality of first light sources functioning as one of an anti-collision light and a beacon light and with the at least one second light source functioning as a navigation light. The term navigation light refers to the kind of exterior aircraft light units that constantly emit light for passive visibility. In many applications, a navigation light emits one of red, green and white light, such that other aircraft can deduce the orientation and moving direction of the aircraft in question. The combination of the curved pattern of first light sources and the convex shape of the lens cover allow for a very compact light unit design that is able to integrate the plurality of first light sources and the at least one second light source in a small space, without the light sources blocking each other's light output.

According to a further embodiment, the plurality of first light sources and/or the at least one second light source are/is LED(s). Providing LEDs as light sources allows for high light yield, high efficiency and low space requirements. Accordingly, above discussed features with respect to the arrangement of the light sources and the interdependence between this arrangement and the lens cover shape are particularly beneficial in the context of using LEDs as light sources. The LED's may be oriented with their axes substantially in the first cross-sectional plane. In other words, the LED's may have their light emission direction of highest intensity substantially in the first cross-sectional plane.

Exemplary embodiments of the invention further include an aircraft, such as an airplane, comprising at least one exterior aircraft light unit, as described in any of the embodiments above. The modifications and advantages, discussed above with respect to the exterior aircraft light unit, are applicable to the aircraft in an analogous manner.

BRIEF DESCRIPTION OF THE DRAWINGS

Further exemplary embodiments of the invention are described below with respect to the accompanying drawings, wherein.

DETAILED DESCRIPTION

Figure 1:
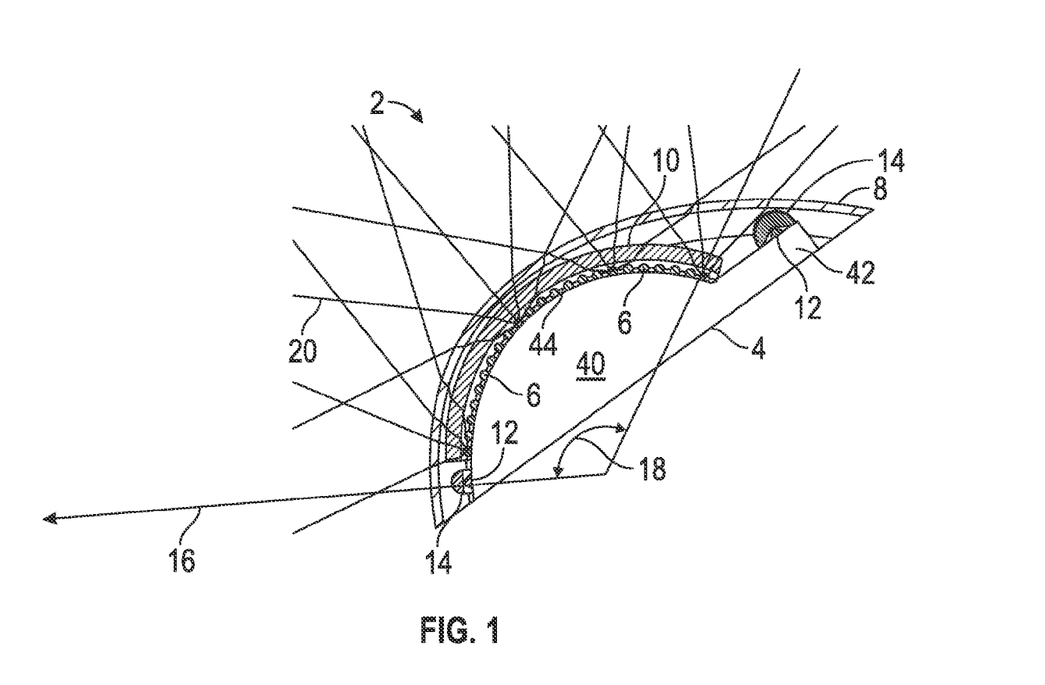
FIG. 1 shows a first cross-sectional view of an exterior aircraft light unit in accordance with an exemplary embodiment of the invention, depicted in a first mode of operation.

FIG. 1 shows an exemplary exterior aircraft light unit 2 in accordance with an exemplary embodiment of the present invention. The exterior aircraft light unit 2 is shown in a cross-sectional view in FIG. 1. The cross-section is taken along a first cross-sectional plane, which first cross-section plane is a horizontal cross-sectional plane, when the exterior aircraft light unit 2 is arranged in its operating position.

The exterior aircraft light unit 2 has a mounting structure 4. The mounting structure 4 has a main portion 40 and a leg portion 42. The main portion 40 has the shape of a part of a circular disc, in particular of a part of circular disc that is comprised of less than 50% of the full circular disc. Accordingly, one side of the main portion 40 comprises a curved edge 44, having a circular curvature, whereas the opposing side of the main portion 40 comprises a straight edge. The leg portion 42 extends from the main portion 40 to one side thereof. The leg portion 42 has a generally rectangular shape in the first cross-sectional plane, depicted in FIG. 1.

The exterior aircraft light unit 2 further comprises a plurality of first light sources 6. In the embodiment of FIG. 1, 23 first light sources 6 are depicted. Other embodiments may have a smaller or larger number of first light sources 6. The first light sources 6 are arranged along the curved edge 44 of the mounting structure 4. In particular, the first light sources 6 are lined up on the curved edge 44 of the mounting structure 4. In this way, the first light sourced 6 are arranged in a curved pattern on the mounting structure 4. This curved pattern of first light sources 6 extends over most of the curved edge 44 of the mounting structure 4.

The exterior aircraft light unit 2 further comprises a refractive optical element 10. The refractive optical element 10 also has a circular shape in the first cross-sectional plane, depicted in FIG. 1. In particular, the curvature of the refractive optical element 10 is chosen in such a way that the refractive optical element 10 is spaced from the curved edge 44 of the mounting structure 4 by the same distance along its entire length. In other words, the refractive optical element 10 has the same distance from all of the first light sources 6.

In the exemplary embodiment of FIG. 1, the exterior aircraft light unit 2 further comprises two second light sources 12. One of the two second light sources 12 is arranged on the leg portion 42 of the mounting structure 40. The other one of the two second light sources 12 is arranged on the curved edge 44 of the mounting structure 4. The first light sources 6 are arranged between the two second light sources 12. Each of the two second light sources 12 is covered by a dedicated refractive optical element 14.

The exterior aircraft light unit 2 further comprises a lens cover 8. The lens cover 8 is a thin transparent structure that allows for the passage of light therethrough. It is a convex structure, when seen from outside of the exterior aircraft light unit 2, and forms an enclosure for the other elements of the exterior aircraft light unit 2, discussed above.

All of the first light sources as well as the two second light sources are LED's in the exemplary embodiment of FIG. 1.

Further elements of the exterior aircraft light unit, such as the power lines and the control electronics, are known to the skilled person and are not shown throughout the Figs.

An anti-collision light mode of operation is discussed as follows. In the exemplary embodiment of FIG. 1, the exterior aircraft light unit 2 is oriented in a way to be installed in the tip of the right wing of an airplane, with arrow 16 indicating the flight direction. In an anti-collision mode of operation, the first light sources 6 are flashed according to a predefined pattern. In other words, a sequence of flashes, which may be a regular sequence of flashes of equal lengths and emission breaks of equal lengths, is emitted from the plurality of first light sources 6.

The situation during such a flash is illustrated in FIG. 1. In particular, a selection of light rays 20 is depicted for illustration. In order not to overload FIG. 1, only some light rays 20, as emitted by four of the first light sources 6, are shown. It is apparent that each of the first light sources 6 emits light during the flashes and that each of the first light sources 6 emits a continuous light intensity distribution over a solid angle of $2\pi$. Accordingly, the depicted light rays 20 are for better illustration only.

As can be seen in FIG. 1, the light rays 20 are refracted by both the refractive optical element 10 and the lens cover 8. Even the light rays leaving the plurality of first light sources at angles that are far away from the direction normal to the curved edge 44 of the mounting structure 4 are not internally reflected by the lens cover 8. Instead, these light rays also leave the exterior aircraft light unit 2 and contribute to the overall emitted light intensity distribution. As can further be seen, the refractive effect by the lens cover 8, being a thin structure, is not very strong for the light rays 20. In this context, it is re-iterated that the curved pattern of the first light sources 6 in combination with the convex shape of the lens cover 8 allows for a reduction or elimination of internal reflection at the lens cover 8.

Most of the light emitted by the first light sources 6 leaves the exterior aircraft light unit 2 within an angle of 140° with respect to the flight direction 16. This angle of 140° is referenced with reference numeral 18. Such an opening angle of 140° has been found a good opening angle for a wing tip anti-collision light, because it enables other lights to complete the required 360° anti-collision lighting in a favourable manner.

Figure 2:
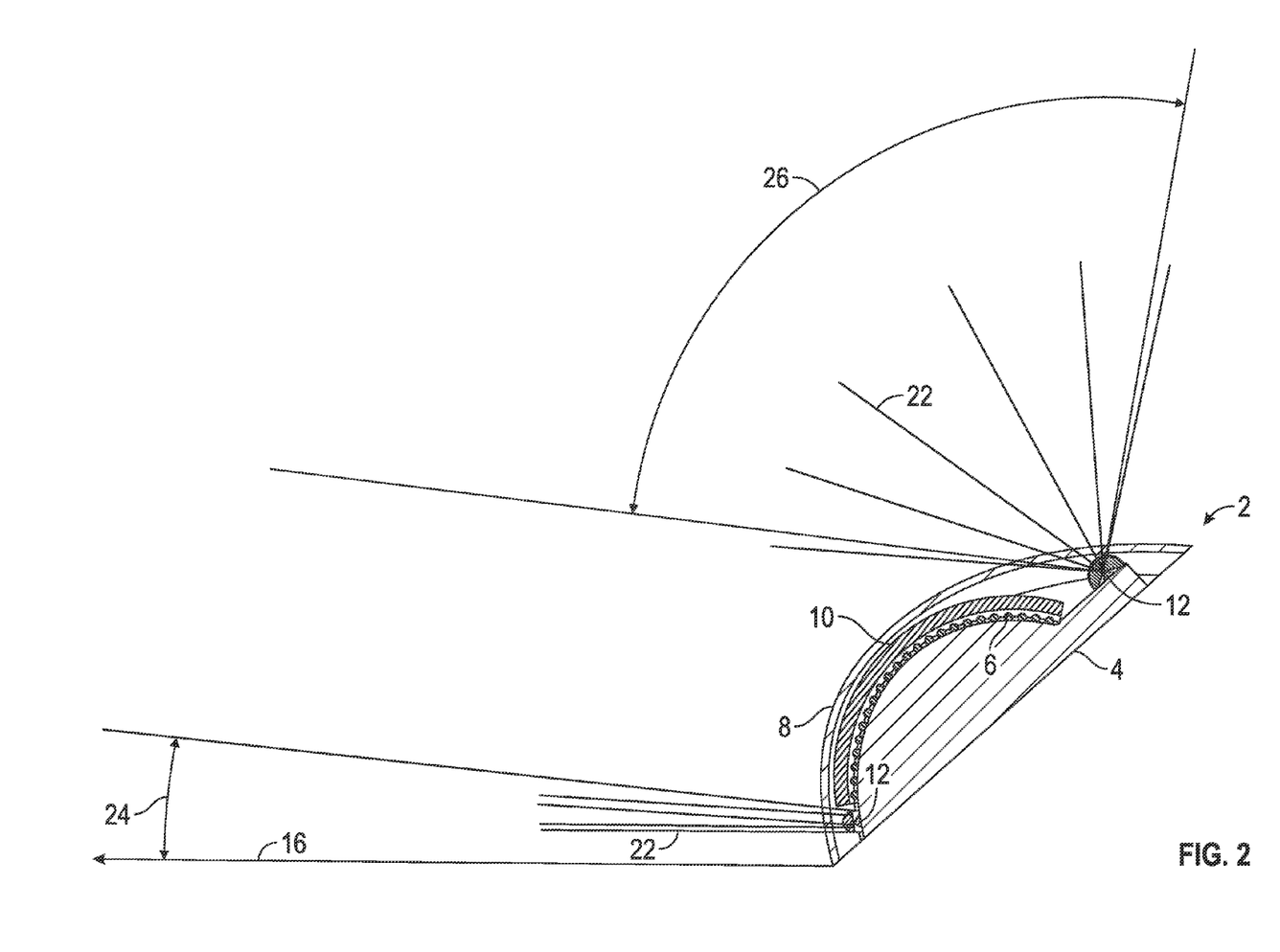
FIG. 2 shows the exterior aircraft light unit of FIG. 1, depicted in a second mode of operation.

FIG. 2 shows the exterior aircraft light unit 2 of FIG. 1 in a navigation light mode of operation. In this mode of operation, the plurality of first light sources 6 do not emit light. Instead, the two second light sources 12 emit light in the navigation light mode of operation. For a better illustration, a plurality of light rays 22 are depicted, which light rays 22 are emitted from the two second light sources 12. The dedicated refractive optical element of the second light source 12 that is arranged on the curved edge of the mounting structure 4 emits light in a range of directions close to the flight direction 16. In particular, the opening angle 24 of the light emitted from this second light source 12 is about 15° in the first cross-sectional plane, depicted in FIG. 2. The dedicated refractive optical element of the other second light source, i.e. of the second light source that is positioned on the leg portion of the mounting structure 4, is shaped to distribute the light from the second light source 12 across an angle of about 95° in the first cross-sectional plane. This angle of about 95° is referenced with reference numeral 26. The angle 24 and the angle 26 together form an opening angle of about 110° for the exterior aircraft light unit 2 in the first cross-sectional plane in the navigation light mode of operation. This angle of 110° is in line with the generally accepted requirements for wing-tip navigation lights.

As the exterior aircraft light unit 2 can be operated in both an anti-collision mode of operation as well as an navigation mode of operation, which two modes have been discussed with respect to FIGS. 1 and 2 above, the exterior aircraft light unit 2 may also be referred to as a combined anti-collision and navigation light unit. The two modes of operation may be present at different points in time. However, it is also possible that both modes of operation are present at the same time.

Figure 3:
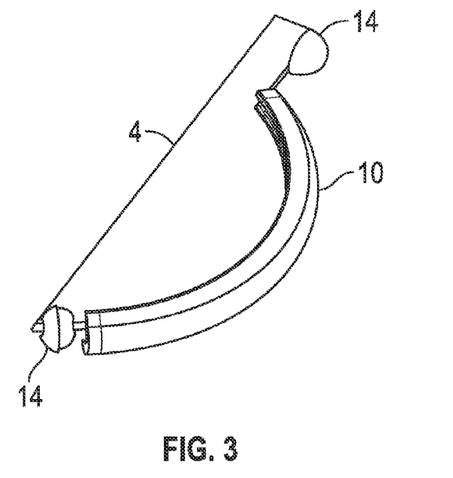
FIG. 3 shows a perspective view of a portion of the exterior aircraft light unit of FIG. 1.

In FIG. 3, some of the components of the exterior aircraft light unit 2 of FIGS. 1 and 2 are shown in a perspective, three-dimensional manner. In particular, the mounting structure 4, the refractive optical element 10 and the two dedicated refractive optical elements 14 are shown in FIG. 3. As the refractive optical element 10 covers the plurality of first light sources 6 and as the two dedicated refractive optical elements 14 cover the two associated second light sources 12 in the viewing direction of FIG. 3, these elements are not visible. Further, the lens cover 8 is not shown in FIG. 3. It can be seen, that the mounting structure 4 is a rather flat structure, while the refractive optical element 10 and the two dedicated refractive optical elements 14 have a considerably larger extension in the third dimension.

Figure 4:
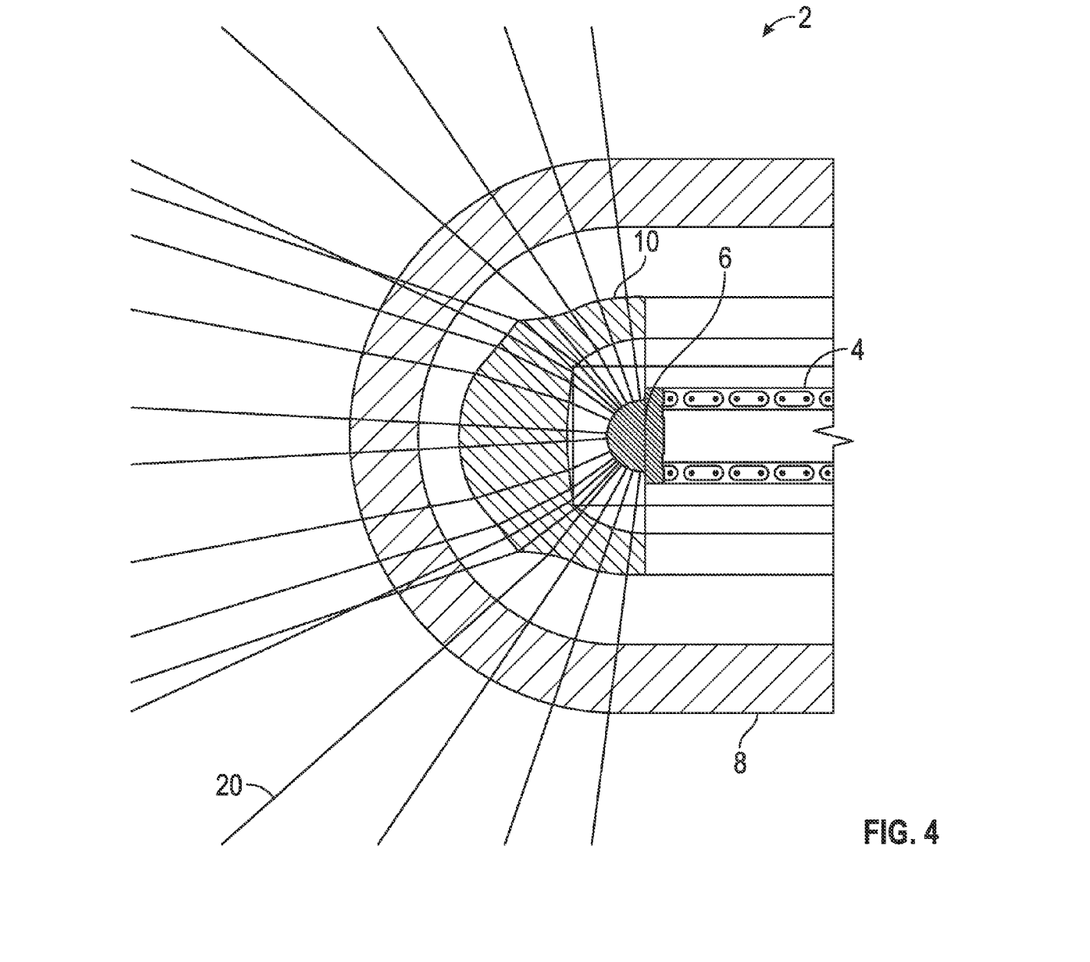
FIG. 4 shows a second cross-sectional view of the exterior aircraft light unit of FIG. 1.

In FIG. 4, a second cross-sectional view of the exemplary exterior aircraft light unit 2 of FIGS. 1-3 is shown. In FIG. 4, the exterior aircraft light unit 2 is shown in a second cross-sectional plane that is orthogonal to the first cross-sectional plane of FIGS. 1 and 2. The second cross-sectional plane is further oriented in such a way with respect to the exterior aircraft light unit 2 that it includes a light emission direction normal to the curved edge 44 of the mounting structure in the first cross-sectional plane of FIGS. 1 and 2. Even further, the second cross-sectional plane extends through the center of one of the first light sources 6. In the exemplary embodiment of FIG. 4, the second cross-sectional plane extends through one of the first light sources 6 that are arranged towards the left in the first cross-sectional plane of FIGS. 1 and 2. For these first light sources 6, the lens cover 8 is arranged very closely to the refractive optical element 10, as is depicted in FIG. 4.

In the cross-sectional view of FIG. 4, the mounting structure 4 is shown towards the right. Mounted on the left edge of the mounting structure 4, which left edge is a part of the curved edge 44 of the mounting structure 4, there is provided one of the first light sources 6. The refractive optical element 10 wraps around the first light source 6. Further, the lens cover 8 wraps around the refractive optical element 10.

As the cross-sectional view of FIGS. 1 and 2 is a horizontal cross-sectional view, when the exterior aircraft light unit 2 is arranged in its operational position in an aircraft, the cross-sectional view of FIG. 4 is a vertical cross-sectional view, when the exterior aircraft light unit 2 is placed in the aircraft.

In FIG. 4, there are further shown a plurality of exemplary light rays 20, as emitted from the first light source 6 during one of the light flashes in the anti-collision light mode of operation. The light rays 20 provide an illustration of how the refractive optical element 10 shapes the vertical light emission distribution of the exterior aircraft light unit 2. The refractive optical element 10 is shaped in such a way that the light, emitted by the first light source 6, satisfies the requirements of the Federal Aviation Regulations (FAR) for the vertical light intensity distribution of anti-collision lights. The particular shape of the refractive optical element used for this purpose is described in greater detail with respect to FIG. 5.

Again, it can be seen from FIG. 4 that the light rays 20 reach the lens cover 8 at angles that are very close to normal. This is mainly due to the first light source 6 being positioned close to the center of the curvature of the lens cover in the depicted cross-sectional plane. In this way, the refractive impact of the lens cover 8 is kept low.

Figure 5:
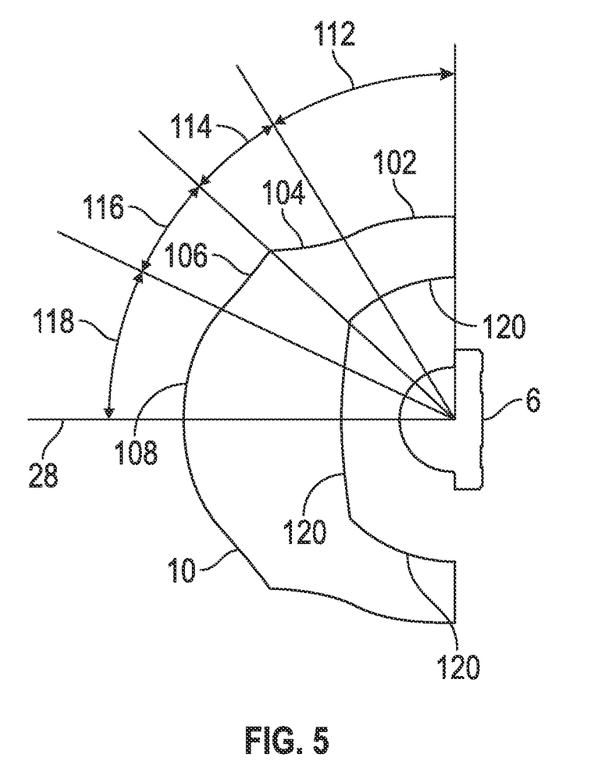
FIG. 5 shows a portion of the exterior aircraft light unit of FIG. 1 in the same cross-sectional plane as depicted in FIG. 4.

FIG. 5 shows the first light source 6 and the refractive optical element 10 of FIG. 4 in an enlarged illustration. The cross-sectional plane through these elements is the same as in FIG. 4.

In the cross-sectional plane of FIG. 5, the inner surface of the refractive optical element 10 consists of three concave portions 120. These three concave portions 120 form a symmetric inner surface with respect to the direction normal to the first light source 6, i.e. with respect to the horizontal direction in the cross-sectional plane of FIG. 5, when the exterior aircraft light unit 2 is installed in an aircraft. The two concave portions 120 arranged in a symmetric manner with respect to the normal direction 28 cover respective opening angles of 48°, measured from the center of the first light source 6. These two concave portions 120 are circular. The third concave portion 120, disposed between the other two concave portions 120, covers an opening angle of 84°.

The outer surface of the refractive optical element 10 is also symmetric with respect to the normal direction 28. In each of the symmetric halves of the outer surface, the refractive optical element 10 comprises four distinct outer surface portions, two of which are concave and two of which are convex. In particular, the upper half of the refractive optical element 10, as shown in FIG. 5, comprises a first outer surface portion 102, which is convex, a second outer surface portion 104, which is concave, a third outer surface portion 106, which is also concave, and a fourth outer surface portion 108, which is again convex. The first outer surface portion 102 extends over an opening angle of 32°, measured with respect to the center of the first light source 6 and referenced with reference numeral 112. The second outer surface portion 104 extends over an opening angle of 16°, referenced with reference numeral 114. The third outer surface portion 106 extends over an opening angle of 17°, referenced with reference numeral 116. The fourth outer surface portion 108 extends over an opening angle of 25°, referenced with reference numeral 118.

The inner and outer surfaces of the refractive optical element 10 collect the light emitted from the first light source 6 in an angular range of ±45° with respect to the horizontal direction 28 and concentrate it between ±22.5° for achieving a high peak intensity. Overall, the inner and outer surfaces of the refractive optical element 10 of the exemplary embodiment of FIG. 5 are shaped in such a way that they transform the light emission distribution of the first light source 6 into a light emission distribution that satisfies the requirements of the Federal Aviation Regulations (FAR) for the vertical light intensity distribution of anti-collision lights. The exemplary combination of convex and concave surface portions allows for a particularly power-efficient way of satisfying the FAR requirements.

The given shapes of the inner and outer surfaces of the refractive optical element allow for a very efficient satisfaction of the FAR requirements for the vertical light intensity distribution of anti-collision lights. By providing this particular shape, the requirements may be satisfied in a very targeted manner, meaning that not much more light is emitted for any particular direction than required by the FAR requirements. Accordingly, the light from the plurality of first light sources 6 is put to a very efficient use, keeping the overall power consumption of the exterior aircraft light unit 2 low.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Exterior aircraft light unit, comprising:
   a mounting structure,
   a plurality of first light sources arranged on the mounting structure, and
   a lens cover arranged over the plurality of first light sources, the lens cover having a convex shape at least in a first cross-sectional plane,
   wherein the plurality of first light sources are arranged in a curved pattern, with the curved pattern having the same direction of curvature as the convex shape of the lens cover in the first cross-sectional plane and with the plurality of first light sources being oriented towards the lens cover in the first cross-sectional plane,
   wherein the exterior aircraft light unit further comprises a refractive optical element arranged between the plurality of first light sources and the lens cover, with the refractive optical element having a curved shape extending along the curved pattern of the plurality of first light sources, and
   wherein the exterior aircraft light unit is configured to be installed in an aerodynamic structure of an airplane wing.

2. Exterior aircraft light unit according to claim 1, wherein the plurality of first light sources are arranged as a row of adjacent light sources in the curved pattern.

3. Exterior aircraft light unit according to claim 1, wherein a curvature radius of the lens cover is between 100% and 200% of a curvature radius of the curved pattern along at least 80% of the curved pattern in the first cross-sectional plane.

4. Exterior aircraft light unit according to claim 1, wherein the curved pattern and the lens cover have such corresponding shapes that light emitted from the plurality of first light sources in a direction normal to the curved pattern reaches the lens cover at an angle of less than 45° with respect to a direction normal to the lens cover.

5. Exterior aircraft light unit according to claim 1, wherein the lens cover has a convex shape in a plurality of second cross-sectional planes orthogonal to the first cross-sectional plane and extending through the plurality of first light sources.

6. Exterior aircraft light unit according to claim 5, wherein the plurality of first light sources are spaced from the lens cover in such a way that the light, emitted from the plurality of first light sources in the plurality of second cross-sectional planes at an angle of less than 45° with respect to a direction normal to the curved pattern, reaches the lens cover at an angle of less than 30° with respect to a direction normal to the lens cover.

7. Exterior aircraft light unit according to claim 5, wherein, for each of the plurality of first light sources, a distance between the respective first light source and the lens cover is less than 200% of a curvature radius of the lens cover in the respective second cross-sectional plane.

8. Exterior aircraft light unit according to claim 5, wherein the plurality of first light sources are spaced from the lens cover in such a way that the light, emitted from the plurality of first light sources in the plurality of second cross-sectional planes at an angle of less than 45° with respect to a direction normal to the curved pattern, reaches the lens cover at an angle of less than 20° with respect to a direction normal to the lens cover.

9. Exterior aircraft light unit according to claim 5, wherein, for each of the plurality of first light sources, a distance between the respective first light source and the lens cover is between 50% and 150% of a curvature radius of the lens cover in the respective second cross-sectional plane.

10. Exterior aircraft light unit according to claim 1, wherein the refractive optical element comprises, in at least one second cross-sectional plane orthogonal to the first cross-sectional plane and extending through one of the plurality of first light sources, a combination of convex and concave outer surface portions.

11. Exterior aircraft light unit according to claim 1, configured to be mounted to an aircraft with the first cross-sectional plane being oriented horizontally.

12. Exterior aircraft light unit according to claim 1, wherein the exterior aircraft light unit is one of an anti-collision light unit and a beacon light unit.

13. Exterior aircraft light unit according to claim 1, further comprising:
    at least one second light source arranged on the mounting structure and positioned besides the curved pattern of the plurality of first light sources.

14. Exterior aircraft light unit according to claim 13, wherein each of the at least one second light source has a dedicated refractive optical element arranged between the respective second light source and the lens cover.

15. Exterior aircraft light unit according to claim 13, wherein the exterior aircraft light unit is one of a combined anti-collision and navigation light unit and a combined beacon and navigation light unit, with the plurality of first light sources functioning as one of an anti-collision light and a beacon light and with the at least one second light source functioning as a navigation light.

16. An aircraft comprising at least one exterior aircraft light unit in accordance with claim 1.

17. Exterior aircraft light unit according to claim 1, wherein a curvature radius of the lens cover is between 100% and 140% of a curvature radius of the curved pattern along at least 80% of the curved pattern in the first cross-sectional plane.

18. Exterior aircraft light unit according to claim 1, wherein the curved pattern and the lens cover have such corresponding shapes that light emitted from the plurality of first light sources in a direction normal to the curved pattern reaches the lens cover at an angle of less than 30° with respect to a direction normal to the lens cover.

* * * * *